United States Patent [19]

Sherman

[11] Patent Number: 5,069,656
[45] Date of Patent: Dec. 3, 1991

[54] MULTISPEED POWER TRANSMISSION

[75] Inventor: James F. Sherman, Brighton, Mich.

[73] Assignee: General Motors Corporation, Detroit, Mich.

[21] Appl. No.: 660,190

[22] Filed: Feb. 25, 1991

[51] Int. Cl.⁵ .................. F16H 57/10; F16H 57/08
[52] U.S. Cl. .................................. 475/276; 475/280; 475/281; 475/284
[58] Field of Search ............... 475/275, 276, 280, 281, 475/284, 285, 290, 291, 279

[56] References Cited

U.S. PATENT DOCUMENTS

| | | | |
|---|---|---|---|
| 3,811,343 | 5/1974 | Mori et al. ...................... | 475/284 X |
| 3,956,946 | 5/1976 | Murakami et al. ............. | 475/280 X |
| 3,987,690 | 10/1976 | Murakami et al. ............ | 475/276 |
| 4,027,551 | 6/1977 | Murakami et al. ............ | 475/276 |
| 4,653,347 | 3/1987 | Hiraiwa ......................... | 475/281 X |
| 4,660,439 | 4/1987 | Hiraiwa ......................... | 475/284 X |

Primary Examiner—Richard Lorence
Assistant Examiner—David E. Henn
Attorney, Agent, or Firm—Donald F. Scherer

[57] ABSTRACT

A multi-speed power transmission has a plurality of forward speed ratios, the lowest of which is provided by two planetary gear sets that are compound. One of the planetary gear sets is effective during the low ratio only while the other is effective in more than one forward ratio.

3 Claims, 1 Drawing Sheet

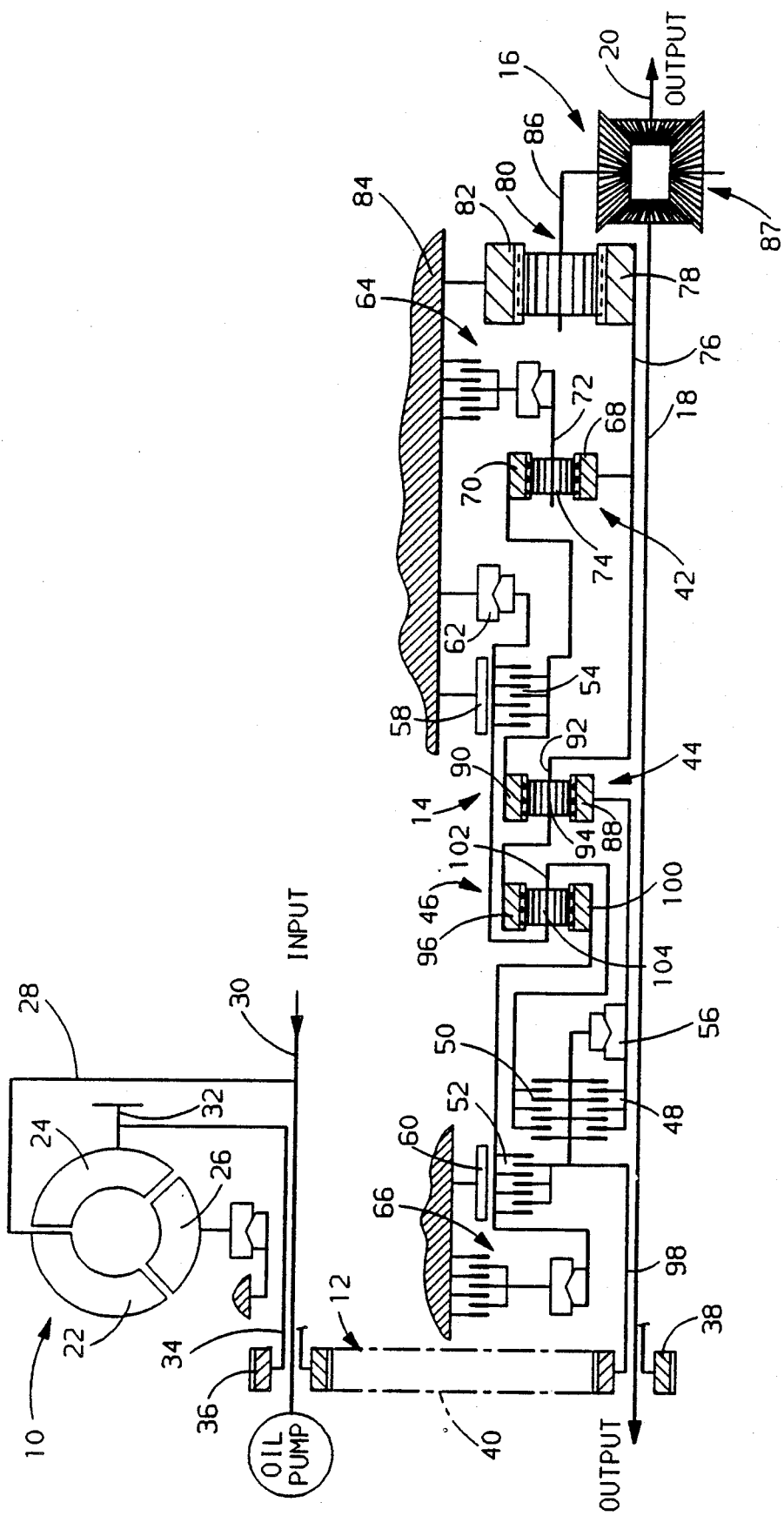

1

MULTISPEED POWER TRANSMISSION

BACKGROUND OF THE INVENTION

This invention relates to power transmissions, and more particularly, to multispeed planetary gear power transmissions having at least one reverse torque and speed ratio and at least three forward torque and speed ratios, the lowest of which forward ratio has a planetary gear set unique thereto.

In prior art planetary gear transmissions, the gearing is compounded in such a manner that changing the low ratio gear set affects the other ratios in the transmission. In these systems, there is no planetary gear set unique to the lowest ratio. Other prior art transmissions have a single planetary gear set for the low ratio. However, in these transmissions, the overall ratio coverage is limited, and also these transmissions are not compatible with one-way drive mechanisms utilized for timing control during a ratio interchange. Thus, the shift timing controls in these transmissions is somewhat complicated.

SUMMARY OF THE INVENTION

The present invention permits the use of planetary gear sets compounded to establish the lowest forward ratio, thus obtaining the wide ratio coverage available with these arrangements. However, one of the planetary gear sets is unique to the low ratio such that changing the gear members thereof affects only the lowest forward ratio and the overall ratio coverage. This permits a wide range of overall ratio coverage within a transmission family.

It is an object of this invention to provide an improved multispeed power transmission, wherein the lowest of a plurality of forward speed ratios is obtained by compounding two or more planetary gear sets, and wherein one of the planetary gears sets is unique to the lowest forward speed ratio.

It is another object of this invention to provide an improved multispeed power transmission with a wide overall ratio spread, wherein a minimum of components are exposed to the maximum torque transmitted.

It is a further object of this invention to provide an improved multispeed power transmission, wherein the planetary gear sets are compounded such that a minimum of the components are exposed to the maximum torque transmitted, and wherein the lowest of the forward speed ratios is obtained by compounding planetary gear sets with one of the compounded sets being unique to the lowest forward ratio, whereby changing the gear teeth within the unique planetary gear set affects only the lowest forward speed ratio and the overall ratio spread.

DESCRIPTION OF THE DRAWINGS

The drawing is a schematic representation of an exemplary embodiment of a power transmission having a planetary gear arrangement incorporating the present invention.

DESCRIPTION OF THE EXEMPLARY EMBODIMENT

The power transmission shown in schematic form includes a torque converter 10, a chain drive 12, a planetary gear arrangement 14, a final drive and differential output gear arrangement 16 and a pair of output shafts 18 and 20. In this schematic arrangement, the transmission is shown in a form to be utilized with a transversely mounted engine wherein the output shafts 18 and 20 are essentially aligned or coplanar with the axis of the driving wheels.

The torque converter 10 is a conventional hydrodynamic drive unit having an impeller 22, a turbine 24 and a stator 26. The impeller 22 is drivingly connected to an input shell 28 to an engine output shaft 30. The torque converter 10 also includes a conventional torque converter clutch 32 which will permit the engine output torque to bypass the torque converter. The turbine 24 is drivingly connected through a shaft 34 to an input sprocket 36 which in turn is connected to a sprocket 38 by a conventional chain 40. These elements 36, 38 and 40 comprise the chain drive unit 12.

The planetary gear arrangement 14 includes three ratio planetary gear sets 42, 44 and 46 which are operatively connected with selectively engageable fluid operated friction clutch assemblies 48, 50, 52 and 54, one-way clutch assembly 56, selectively engageable fluid operated friction brakes 58 and 60, one-way brake 62 and a pair of brake assemblies 64 and 66.

The planetary gear set 42 includes a sun gear 68, a ring gear 70 and a carrier 72 on which is rotatably supported a plurality of pinion gears 74 disposed in meshing relation with the sun gear 68 and ring gear 70. The carrier 72 is drivingly connected with brake assembly 64. The ring gear 70 is drivingly connected with one side of the clutch 54. The sun gear 68, which is drivingly connected with a shaft 76, is also connected to drive a sun gear 78 which is a member of a final drive planetary gear arrangement 80. The planetary gear arrangement 80 includes a ring gear 82 continuously connected to a stationary housing 84 and a carrier member 86 continuously drivingly connected with a differential gear set 87. The planetary gear arrangement 80 and the differential gear set 87 are components of the output gear arrangement 16.

The final drive planetary gear set 80 provides a reduction ratio between the shaft 76 and the output shafts 18 and 20. The planetary gear set 44 includes a sun gear 88, a ring gear 90 and a planet carrier 92 which has rotatably disposed thereon a plurality of pinion gears 94 meshing with the sun gear 88 and ring gear 90.

The planet carrier 92 is drivingly connected with the shaft 76 and also with a ring gear 96 which is a component of the planetary gear set 46. The ring gear 90 is drivingly connected with the ring gear 70 and therefore with one side of the clutch 54. The sun gear 88 is drivingly connected with the one-way clutch 56 and one side of the friction clutch 48. The other side of the friction clutch 48 is drivingly connected to an input shaft 98 which is continuously driven by the sprocket 38 which rotates in proportion to the output speed of the torque converter 10.

The planetary gear set 46 includes a ring gear 96, a sun gear 100 and a planet carrier 102 on which is rotatably disposed a plurality of pinion gears 104 which are disposed in meshing relation with the sun gear 100 and the ring gear 96. The sun gear 100 is drivingly connected with the brake assembly 66 and to the output side of friction clutch 52. The input side of clutch 52 and the input side of clutch 50 are both drivingly connected with the input shaft 98.

The output side of clutch 50 is drivingly connected with the planet carrier 102 which in turn is drivingly connected with the other side of clutch 54 and with the one-way brake 62. The selectively operable friction brakes 58 and 60 are selectively connectible with the carrier 102 and the sun gear 100, respectively.

The selective operation of the various clutches and brakes will provide five forward speeds and one reverse speed ratio between the sprocket 38 and the sun gear 78. The first and lowest speed ratio in the planetary gear arrangement 14 is established by the engagement of the friction brake portion of the brake assembly 64.

During the low ratio, the forward rotation of the input shaft 98 is transmitted through the one-way clutch 56 to the sun gear 88. The planetary gear arrangements 42 and 44 are compounded by the connection of their ring gears 70 and 90, respectively, and by the connection of sun gear 68 and carrier 92. With the brake 64 engaged, the carrier 72 is restrained from reverse rotation such that the sun gear 68 will be driven forwardly as will the sun gear 78 of the final drive gear set 80.

To establish the second forward ratio, the clutch 54 is engaged resulting in the ring gear 90 being restrained from rearward rotation whereby the carrier 92 is driven forwardly resulting in forward rotation of the shaft 76 and therefore sun gear 78. During the operation of second ratio, the planetary gear set 42 does not transmit any torque and does not contribute to the gear ratio.

The third forward gear ratio is established by the engagement of the brake assembly 66 which results in the sun gear 100 being restrained from rotation. The continued forward rotation of sun gear 88 and the restraining of sun gear 100 will result in compounding of the planetary gear arrangements 44 and 46 thereby resulting in an increase in the speed of shaft 76 relative to the shaft 98.

The fourth forward gear ratio is established by the engagement of the clutch 50 which is operable through the clutch 54 to drive the ring gear 90 at the same speed as shaft 98 and sun gear 88, resulting in the 1:1 ratio between shaft 98 and shaft 76. The fifth and highest speed ratio is established by the engagement of the brake 60 which results in the sun gear 100 being restrained from forward rotation and therefore the ring gear 96 will be driven at a faster speed than the input shaft 98. This results in an overdrive relationship between the shaft 98 and the shaft 76 and also in an overdrive relationship of the sun gear 88 with respect to the one-way clutch 56.

The reverse gear ratio is established by engaging the clutch 52 and the brake 58. The brake 58 will establish the carrier 102 as a reaction member while the clutch 52 will establish the sun gear 100 with an input member such that reverse rotation of the ring gear 96 will occur resulting in reverse rotation of the shaft 76 and therefore sun gear 78.

The clutch 48 can be selectively engaged in the second, third and fourth forward speed ratios whenever it is desirable to provide engine coast braking. Likewise, if engine coast braking is desired in the second forward ratio, the brake 58 will be engaged, and if engine coast braking is desired in the third forward speed ratio, the brake 60 will be engaged. Engine braking in fourth forward, can be provided by engagement of clutch 50.

It should be appreciated that the planetary gear set 42 is effective only in the low forward ratio such that changing of the gear elements therein will affect only the low forward ratio. However, since the low forward ratio is effective, the overall spread of transmission gear ratios will also be affected.

As an example of the ratios that can be obtained, the following gear teeth numbers and resulting gear ratios are possible.

The sun gears 68 and 100 each have thirty-four teeth; the sun gear 88 has thirty-eight teeth, and the ring gears 70, 90 and 96 each have seventy-four teeth. With this arrangement, the first gear ratio is 3.84; the second gear ratio is 2.95; the third gear ratio is 1.63; the fourth gear ratio is 1.0 and the fifth gear ratio is 0.68. The reverse gear ratio will be 2.13.

The overall spread between the first forward gear ratio and the fifth forward gear ratio is 5.64. In other words, the torque at the output shaft and lowest forward ratio is 5.64 times the torque of the overdrive ratio. By changing the number of teeth on either or both of the sun gear 68 and ring gear 70, the lowest forward speed ratio can be increased or decreased without affecting any of the other ratios within the transmission. However, the change in the forward ratio will affect the overall ratio coverage. For example, if it is desirable to have a higher low ratio resulting in increased pulling power of the vehicle, the low ratio can be increased and the step ratio between first and second gear will also increase.

The planetary gear set 42 transmits the maximum torque in the system. Therefore, only gear set 42 and the gearing downstream thereof (final drive gear arrangement 16) will be designed to transmit the maximum system torque. This permits the use of similar diameter shafts at the input, such as shaft 98 and the interconnecting members between the clutches 48, 50 and 52, and the respective gear members. This would provide a significant savings in material, and as a general rule, will permit the overall radian dimension of the transmission to be maintained at a minimum.

The clutches and brakes used herewith are preferably conventional fluid operated friction torque transmitting devices of either the disc or band type. Likewise, the one-way devices are conventional components, preferably of either the roller or sprag type, that will transmit torque in one direction and overrun freely in the other direction.

The embodiments of the invention in which an exclusive property or privilege is claimed are defined as follows:

1. A power transmission comprising: input means for delivering power to the transmission including an input shaft and a plurality of selectively engageable input clutch means; output means for delivering power from the transmission including an output shaft; first, second and third planetary gear means each having a sun gear, a ring gear and planet carrier means having pinion gear means rotatably mounted thereon in meshing arrangement with the respective sun gears and ring gears; a plurality of selectively engageable brake means; said ring gear of the first planetary gear means, said planet carrier means of said second planetary gear means and said sun gear of the third planetary gear means being drivingly interconnected for unitary rotation with the output means; the sun gear of said second planetary gear means being operatively connected with a first of said input clutch means; the sun gear of said first planetary gear means being operatively connected with a second of said input clutch means and a first of said brake means; the planet carrier means of said first planetary gear means being operatively connected with a third of said input clutch means, a second of said brake means and with an intermediate clutch means; the ring gear of the second planetary gear means being drivingly connected with the ring gear of the third planetary gear means and with said intermediate clutch means; and the planet carrier means of said third planetary gear means being connected with a third of said brake means; said input clutch means, said intermediate clutch means and said brake means being selectively operable to establish five forward gear ratios including a lowest gear ratio and one reverse gear ratio between the input means and the output means and said third planetary gear means being effective in only the lowest gear ratio.

2. A power transmission comprising: input means for delivering power to the transmission including an input shaft and a plurality of selectively engageable input clutch means; output means for delivering power from the transmission including an output shaft; first, second and third planetary gear means each having a sun gear, a ring gear and planet carrier means having pinion gear means rotatably mounted thereon in meshing arrangement with the respective sun gears and ring gears; a plurality of selectively engageable brake means; said ring gear of the first planetary gear means, said planet carrier means of said second planetary gear means and said sun gear of the third planetary gear means being drivingly interconnected for unitary rotation with the output means; the sun gear of said second planetary gear means being operatively connected with a first of said input clutch means; the sun gear of said first planetary gear means being operatively connected with a second of said input clutch means and a first of said brake means; the planet carrier means of said first planetary gear means being operatively connected with a third of said input clutch means, a second of said brake means and with an intermediate clutch means; the ring gear of the second planetary gear means being drivingly connected with the ring gear of the third planetary gear means and with said intermediate clutch means; and the planet carrier means of said third planetary gear means being connected with a third of said brake means; said input clutch means, said intermediate clutch means and said brake means being selectively operable to establish five forward gear ratios including a lowest gear ratio and one reverse gear ratio between the input means and the output means, said third planetary gear means and said second planetary gear means being compounded to establish the lowest gear ratio when said first input clutch means and said third brake means are selectively engaged and said third planetary gear means being effective in only the lowest gear ratio.

3. A power transmission comprising: input means for delivering power in the form of torque and speed to the transmission including an input shaft and a plurality of selectively engageable input clutch means; output means for delivering power from the transmission including an output shaft; first, second and third planetary gear ratio means for transmitting the speed and torque at a plurality of selectively establishable torque and speed ratios from said input shaft to said output shaft, each planetary gear ratio means having a sun gear, a ring gear and planet carrier means having pinion gear means rotatably mounted thereon in meshing arrangement with the respective sun gears and ring gears; a plurality of selectively engageable brake means; said ring gear of the first planetary gear ratio means, said planet carrier means of said second planetary gear ratio means and said sun gear of the third planetary gear ratio means being drivingly interconnected for unitary rotation with the output means; the sun gear of said second planetary gear ratio means being operatively connected with a first of said input clutch means; the sun gear of said first planetary gear ratio means being operatively connected with a second of said input clutch means and a first of said brake means; the planet carrier means of said first planetary gear ratio means being operatively connected with a third of said input clutch means, a second of said brake means and with an intermediate clutch means; the ring gear of the second planetary gear ratio means being drivingly connected with the ring gear of the third planetary gear ratio means and with said intermediate clutch means; and the planet carrier means of said third planetary gear ratio means being connected with a third of said brake means; said input clutch means, said intermediate clutch means and said brake means being selectively operable to establish five forward torque and speed ratios including a highest torque and lowest speed ratio for delivering a maximum torque to said output means and one reverse torque and speed ratio between the input means and the output means and said third planetary gear ratio means being effective in only the highest torque and lowest speed ratio and being the only planetary gear ratio means subjected to the maximum torque.

* * * * *